United States Patent
Hager et al.

(10) Patent No.: US 9,367,914 B2
(45) Date of Patent: Jun. 14, 2016

(54) IMAGING SYSTEM AND METHOD FOR USE OF SAME TO DETERMINE METRIC SCALE OF IMAGED BODILY ANATOMY

(71) Applicants: Gregory D. Hager, Baltimore, MD (US); Masaru Ishii, Baltimore, MD (US); Eric M. Meisner, Baltimore, MD (US); Daniel J. Marota, Baltimore, MD (US); Haluk N. Tokgozoglu, Baltimore, MD (US)

(72) Inventors: Gregory D. Hager, Baltimore, MD (US); Masaru Ishii, Baltimore, MD (US); Eric M. Meisner, Baltimore, MD (US); Daniel J. Marota, Baltimore, MD (US); Haluk N. Tokgozoglu, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 389 days.

(21) Appl. No.: 13/895,813

(22) Filed: May 16, 2013

(65) Prior Publication Data
US 2013/0321583 A1    Dec. 5, 2013

Related U.S. Application Data

(60) Provisional application No. 61/647,794, filed on May 16, 2012.

(51) Int. Cl.
*A61B 1/00* (2006.01)
*A61B 1/04* (2006.01)
(Continued)

(52) U.S. Cl.
CPC ............ *G06T 7/0012* (2013.01); *G06T 7/0042* (2013.01); *G06T 7/0071* (2013.01); *G06T 7/602* (2013.01); *G06T 19/00* (2013.01); *H04N 13/02* (2013.01); *G06T 2200/08* (2013.01); *G06T 2207/10068* (2013.01); *G06T 2207/20076* (2013.01); *G06T 2207/30061* (2013.01); *G06T 2207/30241* (2013.01); *G06T 2207/30244* (2013.01); *G06T 2210/41* (2013.01)

(58) Field of Classification Search
None
See application file for complete search history.

(56) References Cited

U.S. PATENT DOCUMENTS

| 4,862,873 | A | 9/1989 | Yajima et al. |
|---|---|---|---|
| 6,385,482 | B1 | 5/2002 | Boksberger et al. |

(Continued)

FOREIGN PATENT DOCUMENTS

| KR | 1020070104716 A | 10/2007 |
|---|---|---|
| WO | 0241767 A1 | 5/2002 |

OTHER PUBLICATIONS

Agarwal, et al., Reconstructing Rome, Computer, 2010, 43(6):40-47.
(Continued)

*Primary Examiner* — John P Leubecker
*Assistant Examiner* — Arnaldo Torres Diaz
(74) *Attorney, Agent, or Firm* — Yakov Sidorin; Quarles & Brady LLP

(57) ABSTRACT

Repositionable imaging system and method for creating a 3D image of a closed cavity of a patient's anatomy containing the imaging system, estimating characteristics of motion of the system within the cavity, and determining a metric dimension characterizing the cavity without the use of mechanical measurement. The system may include tracking device located externally with respect to the cavity to determine a scale measurement of the system's motion and the structure of the cavity. The system's computer processor is configured to determine triangulated features of the cavity and recover motion scale data with the use of data received from the tracking device. A specific imaging system includes an endoscope (equipped with an electrical coil and complemented with an external electromagnetic tracker).

17 Claims, 9 Drawing Sheets

(51) Int. Cl.
- *G06T 7/00* (2006.01)
- *H04N 13/02* (2006.01)
- *G06T 7/60* (2006.01)
- *G06T 19/00* (2011.01)

(56) References Cited

U.S. PATENT DOCUMENTS

| | | | |
|---|---|---|---|
| 6,553,326 | B1 | 4/2003 | Kirsch et al. |
| 6,711,293 | B1 | 3/2004 | Lowe |
| RE41,175 | E * | 3/2010 | Vashisth et al. .......... 342/357.31 |
| 7,728,868 | B2 * | 6/2010 | Razzaque et al. ................ 348/77 |
| 7,773,827 | B2 * | 8/2010 | Jaynes et al. .................. 382/293 |
| 7,998,062 | B2 * | 8/2011 | Gilboa .......................... 600/117 |
| 8,705,892 | B2 * | 4/2014 | Aguilera et al. .............. 382/285 |
| 8,743,109 | B2 * | 6/2014 | Blank et al. ................... 345/419 |
| 2001/0055462 | A1 * | 12/2001 | Seibel .......................... 385/147 |
| 2002/0049375 | A1 * | 4/2002 | Strommer et al. ............ 600/407 |
| 2004/0019274 | A1 * | 1/2004 | Galloway et al. ............. 600/425 |
| 2005/0054910 | A1 | 3/2005 | Tremblay et al. |
| 2005/0182295 | A1 * | 8/2005 | Soper et al. ................... 600/117 |
| 2006/0106283 | A1 * | 5/2006 | Wallace et al. ............... 600/109 |
| 2009/0010507 | A1 * | 1/2009 | Geng ............................ 382/128 |
| 2010/0149183 | A1 * | 6/2010 | Loewke et al. ............... 345/424 |
| 2010/0177164 | A1 * | 7/2010 | Zalevsky et al. ................ 348/46 |
| 2010/0259594 | A1 | 10/2010 | Johansson et al. |
| 2010/0262000 | A1 * | 10/2010 | Wallace et al. ............... 600/424 |
| 2012/0027257 | A1 | 2/2012 | Lee et al. |
| 2012/0155731 | A1 * | 6/2012 | Weersink et al. ............. 382/131 |

OTHER PUBLICATIONS

Anderson, et al., LAPACK Users' Guide, Third Edition, 1999, by The Society for Industrial and Applied Mathematics [Title Page and Table of Contents Only].
Bay, et al., Speeded-Up Robust Features (SURF), Computer Vision and Image Understanding, 2008, 110:346-359.
Bookstein, Principal Warps: Thin-Plate Splines and the Decomposition of Deformations, IEEE Transactions on Pattern Analysis and Machine Intelligence, 1989, 11(6):567-585.
Bradski, et al., Intel's Computer Vision Library: Applications in Calibration, Stereo, Segmentation, Tracking, Gesture, Face and Object Recognition, IEEE Conference on Computer Vision and Pattern Recognition, 2000, 2:796-797.
Delponte, et al., SVD-Matching Using SIFT Features, Graphical Models, 2006, 68:415-431.
Fischler, et al., Random Sample Consensus: A Paradigm for Model Fitting with Applications to Image Analysis and Automated Cartography, Communications of the ACM, 1981, 24(6):381-395.
Frahm, et al., Building Rome on a Cloudless Day, Proceedings of the 11th European Conference on Computer Vision, Part IV, ECCV'10, pp. 368-381, Berlin, Heidelberg, 2010, Springer-Verlag.
Goesele, et al., Scene Reconstruction from Community Photo Collections, Computer, 2010, 43(6):48-53.
Kuhn, Nonlinear Programming: A Historical View, SIAM-AMS Proceedings, 1976, IX:1-26.
Lowe, Object Recognition from Local Scale-Invariant Features, Proc. of the International Conference on Computer Vision, 1999, 2:1150-1157.
Lowe, Distinctive Image Features from Scale-Invariant Keypoints, International Journal of Computer Vision, 2004, 60 (2):91-110.
Meisner, et al., Anatomical Reconstructions of Pediatric Airways from Endoscopic Images: A Pilot Study of the Accuracy of Quantitative Endoscopy, The Laryngoscope, First Published Online May 10, 2013, pp. 1-7.
Meisner, et al., Measurement of Pediatric Airways with Monocular Endoscopy, IEEE Transactions on Medical Imaging, 2012, 10 pages.
Nister, An Efficient Solution to the Five-Point Relative Pose Problem, IEEE Transactions on Pattern Analysis and Machine Intelligence, 2004, 26(6)756-770.
Park, et al., Robot Sensor Calibration: Solving AX=XB on the Euclidean Group, IEEE Transactions on Robotics and Automation, 1994, 10(5):717-721.
Richa, et al., Three-Dimensional Motion Tracking for Beating Heart Surgery Using a Thin-Plate Spline Deformable Model, The International Journal of Robotics Research, 2010, 29(2-3):218-230.
Sattler, et al., SCRAMSAC: Improving RANSAC's Efficiency with a Spatial Consistency Filter, ICCV, 2009, pp. 2090-2097.
Tokgozoglu, et al., Color-Based Hybrid Reconstruction for Endoscopy, Workshop on Medical Computer Vision at the IEEE Conference on Computer Vision and Pattern Recognition, 2012, pp. 8-15.
Triggs, et al., Bundle Adjustment—A Modern Synthesis, Vision Algorithms: Theory and Practice, 2000, Springer-Verlag LNCS, pp. 298-375.
Vedaldi, et al., VLFeat—An Open and Portable Library of Computer Vision Algorithms, In Proceedings of the International Conference on Multimedia, 2010, pp. 1469-1472.
Wang, et al., Three-Dimensional Reconstruction of Endoscope Images by a Fast Shape from Shading Method, Measurement Science and Technology, 2009, 20(12):125801 (9 pp).
Wang, et al., A Generalized Kernel Consensus-Based Robust Estimator, IEEE Transactions on Pattern Analysis and Machine Intelligence, 2010, 32(1):178-184.
Zickler, et al., Helmholtz Stereopsis: Exploiting Reciprocity for Surface Reconstruction, International Journal of Computer Vision, 2002, 49(2/3):215-227.
PCT International Search Report and Written Opinion, PCT/US2013/041336, Sep. 6, 2013, 11 pages.

* cited by examiner

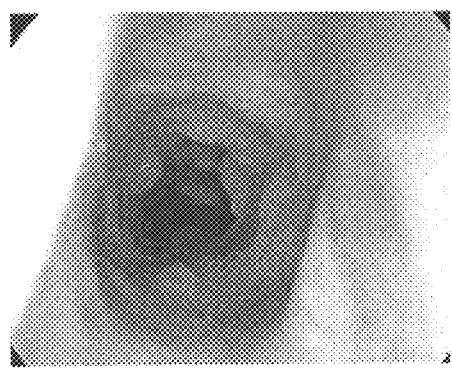
I
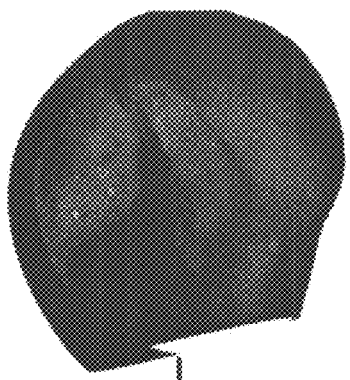
II
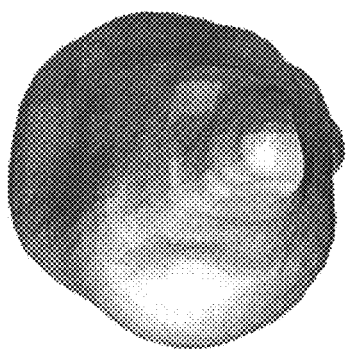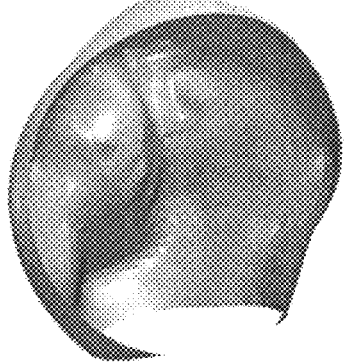
III
FIG. 5A                    FIG. 5B

IMAGING SYSTEM AND METHOD FOR USE OF SAME TO DETERMINE METRIC SCALE OF IMAGED BODILY ANATOMY

CROSS-REFERENCE TO RELATED APPLICATIONS

The present application claims the benefit of and priority from the U.S. Provisional Patent Application No. 61/647,794 filed on May 16, 2012 and titled "Three-Dimensional Imaging from Visible Light Endoscopic Images." The disclosure of this provisional patent application is incorporated herein by reference in its entirety.

STATEMENT REGARDING FEDERALLY SPONSORED RESEARCH

This invention was made with government support under grant R21 IR21EB008490-01A1 awarded by the National Institute of Health. The government has certain rights in the invention.

TECHNICAL FIELD

The present invention relates to imaging system and method and, in particular, to an endoscopic imaging system enabled to form an image of the closed bodily cavity on a true metric scale determined from a series of images of the cavity and data received from an auxiliary device and describing the repositioning of the endoscopic imaging system.

BACKGROUND

Medical treatment of damaged tissue (especially that of ear, nose, throat) often requires physiological measurement. Upper airway conditions such as subglottic stenosis and sleep apnea restricts breathing and may require surgical repair to widen the airway. Accordingly, the measurement of the diameter of an airway facilitates the diagnosis of the severity of the illness and the determination of the required treatment.

There are two common options for measuring the size of the pediatric airway, each less then perfect. Computed Tomography (CT) scanning can be used to provide accurate measurements. While this method provides substantially accurate results, the radiation exposure of the bodily tissue has significant associated risks, especially in pediatric patients. As an alternative, the anatomy of the airway can be measured by fitting a series of graduated endotracheal tubes into the airway during an endoscopic examination. This method is not accurate and may cause further damage to the airway.

Surgical robotics (particularly when used for minimally invasice and natural orifice translumenal endoscopic surgery) has driven the need for three-dimensional (3D) modeling of visible light images obtained from endoscopes and laparoscopes. Stereo laparoscopes exist and are used clinically. No widely used commercial stereo endoscope currently exists, in part due to the smaller diameter (4.5 mm as opposed to 5- to 10 mm for laparoscopes).

State of the art reconstruction techniques such as, for example, those discussed by Agarwal et al. (*Reconstructing rome*, in IEEE Computer, pp. 40-47, 2010), Goesele et al. (*Scene reconstruction from community photo collections*, in Computer, vol. 43, pp, 48-53, 2010), and Frahm et al. (Building rome on a cloudless day, in ECCV. Berlin, Heidelberg, pp. 368-381; Springer-Verlag, 2010) rely heavily on the ability to extract and match salient image features. While such approach may work reasonably well with images obtained under the conditions of consistent lighting of the imaged scene and the scene that has well-defined edges and corners, the biological tissue is smooth and specularly reflective (especially when wet). Therefore, features such as SIFT and RIFT become unreliable.

Similarly, while methods such as SCRAMSAC (see, for example, Sattler et al., *Scramsac: Improving ransac's efficiency with a spatial consistency filter*, in ICCV, pp. 2090-2097, 2009) and ASKC (see Wang et al., *A generalized kernel consensus-based robust estimator*, in IEEE TPAMI, vol. 32, pp. 178-184, January 2010) can be used to compute camera motion with much more than 50 percent outlier data, the small amount of remaining inlier data is not sufficient for estimating the measured surface.

Another approach (devised to determine the shape of the imaged surface with the use of fast shape from the shading method based on the estimates of local surface changes, see Wang et al., in Measurement Science and Technology, vol. 20, no. 12, p. 125801, 2009) relies on a measurement of relative surface deformation and, as a result, does not contain metric descriptors and characteristics of the imaged surface, thereby limiting the utility of the application of the approach to the recovery of the airway diameter. Moreover, this approach assumes a constant albedo. Under such an assumption, specularities and blood vessels may cause imaging artifacts in the resulting reconstruction of the surface.

There remains a need in a system and method that enable a reconstruction of an imaged surface in association with true, metric scale and facilitate absolute measurement of the geometry of the imaged specularly reflective and smooth anatomical regions.

SUMMARY

Embodiments of the invention provide a method for determining geometrical characteristics of a closed cavity associated with a tissue with the use of an imaging system. The method includes receiving, at a data-processing unit of the imaging system, first data acquired by an optical camera of the imaging system (the camera being repositionable within the closed cavity), where such first data represents the closed cavity on a process-determined scale associated with the closed cavity. The method further includes (i) tracking repositioning of the camera in three-dimensional (3D) space with the use of a tracking element of the imaging system to generate second data representing position and orientation of the camera in 3D (the tracking element being in operable communication with the data-processing unit; and (ii) with the data-processing unit, recovering a metric scale of the closed cavity based on the first and second data, wherein the data-processing unit is programmed to derive position and orientation of the camera with respect to a camera's reference frame. The method may additionally include determining structure of the closed cavity on a true geometrical scale and with respect to the derived position and orientation of the camera. Alternatively or in addition, the method may include producing a visually-perceivable representation of a structure of the closed cavity in reference to the recovered metric scale. In one implementation, the method is devoid of using x-ray radiation and/or sizing the closed cavity with the use of a mechanical means.

The method optionally includes processing the first data to recover features that are capable of being matched to detect the repositioning of the camera in reference to a view of a surface of the closed cavity. The processing of the first data may includes determining of the surface of the closed cavity based at least in part on intensity of light characterizing the surface in reflectance, wherein the determining comprises adjusting of surface properties that have been computed with the use of said features to define a recovered surface and computation of geometry of local patches of the surface. Furthermore, the method may include combining the recovered surface and the computed geometry of local patches to form the surface of the closed cavity. The camera employed in the method may contain a camera associated with an endoscope unit that has been positioned in a tubular bodily cavity, and the geometrical characteristics include a diameter of the tubular bodily cavity graded on the recovered true geometrical scale.

Embodiments of the invention additionally provide an imaging system enabled to generate an image representing a closed bodily cavity. The imaging system includes an optical camera configured to acquire first data from inside the closed cavity, where the acquired first data represents a three-dimensional (3D) structure of said closed cavity on a local topographical scale and the optical camera is enabled to move with respect to the closed cavity. The imaging system further includes a tracking device in operable communication with the optical camera and enabling an acquisition of second data that represents repositioning of the optical camera with respect to the closed cavity; and a computer processor in operable cooperation with the optical camera and the tracking element. The computer processor is programmed, with program code stored on a tangible, non-transitory computer-readable medium that is in operable communication with the processor, to recover a metric scale associated with geometry of the closed cavity based on the first and second data; and to determine geometrical characteristics of the closed cavity based on the 3D structure of the closed cavity and with respect to the recovered metric scale.

The imaging system optionally further contains a display device, and the computer processor is further programmed to cause a formation, on the display device, of a visually-perceivable rendering of the closed cavity, said rendering being formed in correspondence with the determined geometrical characteristics. Alternatively or in addition, the computer processor may be programmed to enable identification of scale-invariant features of the closed cavity based on stereo-triangulation of the first data and determination of a three-dimensional (3D) surface of a portion of the closed cavity based on image intensity data from the first data and the identified scale-invariant features. Furthermore, in one embodiment the computer processor may be programmed to determine a metric scale of motion of the optical camera within the closed cavity based on the second data and to determine a geometrical measure associated with the closed cavity based on the recovered metric scale and the determined 3D surface. In a related embodiment, an article of manufacture is provided that comprises an elongated body and a portion of the imaging system, wherein the optical system is housed inside the elongated body, and wherein a portion of the tracking device includes an electrical coil juxtaposed with the elongated body.

Embodiments of the invention additionally provide a method for forming a three-dimensional (3D) rendering a closed cavity of a patient's anatomy, which method includes the steps of (i) acquiring a series of images of the closed cavity with an imaging system repositionably located therein (different images from the series corresponding to different positions of the imaging system); (ii) determining a motion of the imaging system based on the images from the series with a data-processing system that is operably cooperated with the imaging system; (iv) computing a graded dimension of the closed cavity based on a metric scale of the motion of the imaging system that has been determined based at least in part on data representing the repositioning of the imaging system and acquired with the use of a tracking device located externally with respect to the closed cavity; and (v) forming the 3D image of at least a portion of the closed cavity in proportion to the computed graded dimension. The method may additionally include determining the metric scale of the motion of the imaging system based on the data received from the tracking device that is enabled to track at least one of orientation and position of the imaging system in relation to the closed cavity. Such determination of the metric scale, in one implementation, includes determining the metric scale based on the data received from at least one of an electromagnetic tracker, an accelerometer, a gyroscope, and an optical tracker. Alternatively or in addition, the method comprises determining a structure associated with the closed cavity based on the determined motion of the imaging system and the data representing the repositioning of the imaging system.

BRIEF DESCRIPTION OF THE DRAWINGS

The invention will be more fully understood by referring to the following Detailed Description in conjunction with the Drawings, of which:

FIGS. 5A and 5B each show a set of diagrams I, II, and III. The diagrams I are images of larynxes recorded with a system of the invention that utilized an endoscope. The diagrams II show the QE surfaces of the corresponding larynxes with the reprojected image. The diagrams III are shaded surfaces of the larynxes rendered with the use of Phong reflectance model according to an embodiment of the invention.

DETAILED DESCRIPTION

Figure 1A:
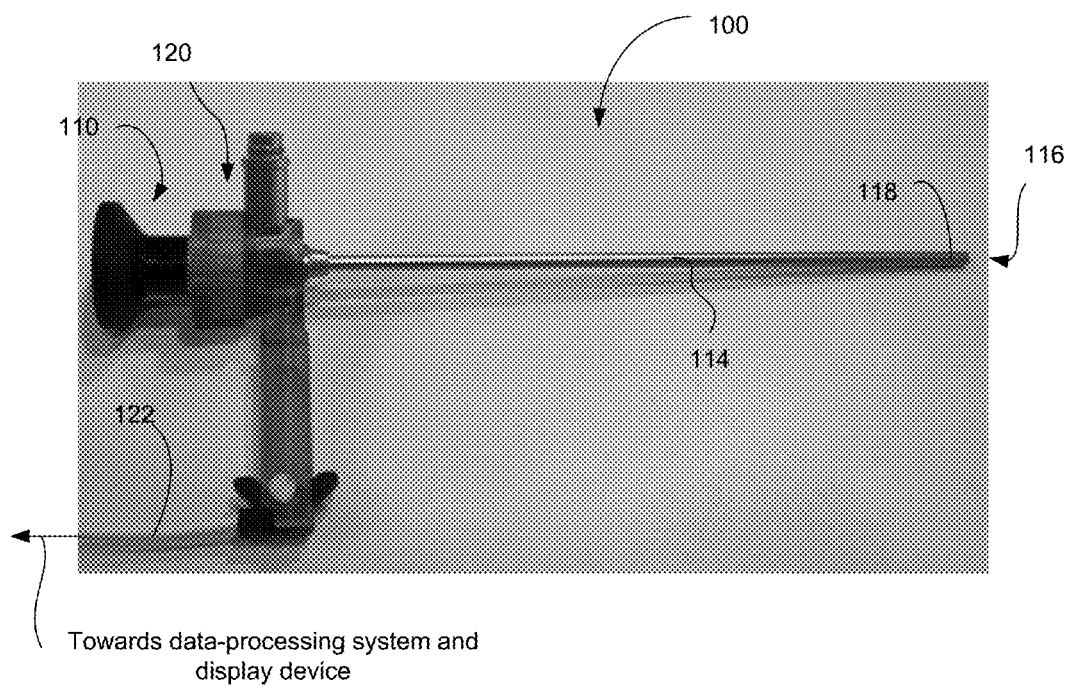
FIG. 1A is a diagram of an embodiment of an imaging system of the invention.

A person of skill in the art will readily recognize that, as a corollary to the endoscopic imaging, the true scale of the motions of the imaging camera is not known due to the ambiguity of scale of the imaged scene that is caused by the relative motion of the imaging system and the scene.

The present invention is directed to a system and method devised to enable accurate reconstruction of human anatomy with the use of images acquired with a single moving endoscope. The method, referred to herein as quantitative endoscopy (or QE), effectuates the estimate of the geometry of an imaged surface (and, in particular, of an imaged bodily cavity such as a pediatric airway) on a true metric scale based on relative motion between an imaging camera and the tissue, sparse bundle adjustment, and estimation of shape of the surface. To independently verify the results of such reconstruction, the devised geometry is compared with that obtained with the use of a computed topography (CT) approach. While the details pertaining to the invention are discussed below mostly in reference to the region-of-interest (ROI) that includes non-collapse tubular cavities such as subglottic and paraglottic regions, it is appreciated that, generally, the reconstruction of anatomy corresponding to any closed bodily cavity is within the scope of the invention.

In particular, images acquired during the endoscopic exploration of a subglottic airway were used to generate a 3D mesh representation of the inside (the hollow) of the airway. Embodiments of the invention, which are specifically structured to characterize feature-poor and highly-variant to illumination changes surfaces, provide a practical alternative to the mechanical measurement of a dimension of the bodily cavity and do not require such mechanical measurement to produce the metrically-accurate dimension(s) of the bodily cavity.

Embodiments of the invention employ a realistic photometric model for surface reconstruction and refinement algorithm. Specifically, according to an embodiment, a sparse set of surface features is extracted from the smooth and specular images acquired with an imaging system of the invention to generate a low-frequency thin-plate spline representation. The representation of the surface is then refined based on the surface's reflective properties. The resulting rendering of the surface is sufficiently accurate for clinical use, specifically in the planning of reconstructive surgery of the subglottic and paraglottic airway.

As discussed below, volumetric reconstructions of anatomic regions based on visible light images acquired during exploration of the region with monocular endoscopic system. Using visible light images provides a cheap alternative to X-ray based imaging and prevents the need for radiation exposure or potentially harmful mechanical sizing of the imaged anatomical region. The results of metrically-accurate volume reconstruction is further compared with measurements obtained from the CT scans.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In the drawings like numbers are used to represent the same or similar elements wherever possible. The depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The invention as recited in claims appended to this disclosure is intended to be assessed in light of the disclosure as a whole, including features disclosed in prior art to which reference is made.

Figure 1B:
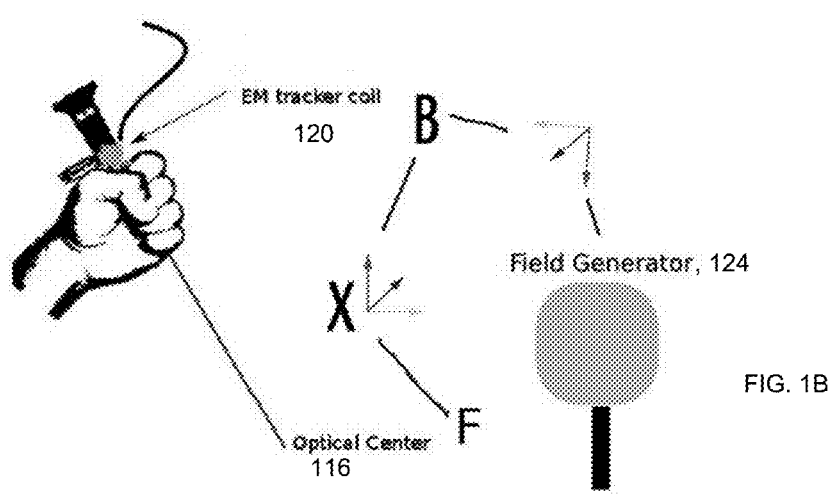
FIG. 1B is a diagram of an alternative embodiment of the imaging system of the invention.

FIGS. 1A, 1B show schematically an embodiment 100 of the endoscopic system of the invention, that included a unit 110 to which a tube 114 (containing an imaging system 116 therein) was operably connected. The imaging system 116 was structured to define a camera with a lens having a clear outwardly-directed field-of-view (FOV) at the distal end 118. In operation, the system 100 (that has been inserted into a bodily cavity such as an airway, for example) was moved to sequentially position the distal end 118 at a plurality of points within the cavity to take an image of the cavity from each of the plurality of points. Juxtaposed with the unit 110 there was an electromagnetic (EM) tracker coil 120. Operational aggregately with the tracker coil 120, an external electromagnetic field generator 124 was used to augment the system 100. The combination of the coil 120 and the generator 124 facilitated the recordation of the motion of the endoscope, in operation, and synchronization of such motion with the video capture.

The data cable 122 connected the system 100 with an external data-processing system (not shown). FIG. 1B illustrates the coordination of the frames of reference used during the image data acquisition. Here, the reference frame B corresponds to the EM tracker coil 120 and the reference frame F corresponds to the imaging system 116.

In practice, prior to image acquisition with the endoscope 100 the distal end 118 of which has been inserted into a hollow of the bodily tissue, a short calibration procedure is performed on the endoscope and the tracker 120, 124. In one implementation, the tracker included an Aurora electromagnetic measurement system. In the course of video-assisted endoscopy, video/set of image frames from the endoscope 100 is recorded using an output from the video tower. The recorded image/video data are decomposed into timestamped images. The timestamp and the recorded EM data from the tracker are used to determine the relative position of the endoscope at the moment when a given image has been acquired.

The electromagnetic measurement system and video equipment (not shown) were connected to an isolating power supply to protect equipment from power surges ad suppress electrical noise. The sensor coil 120 was additionally sterilized before the use of the endoscope.

To achieve the above-mentioned reconstruction of the cavity surface on a true metric scale, an embodiment of the method of the invention incorporates steps for recovering the motion of the camera and the "up-to-scale" 3D positions of salient features of the imaged scene.

Figure 2A:
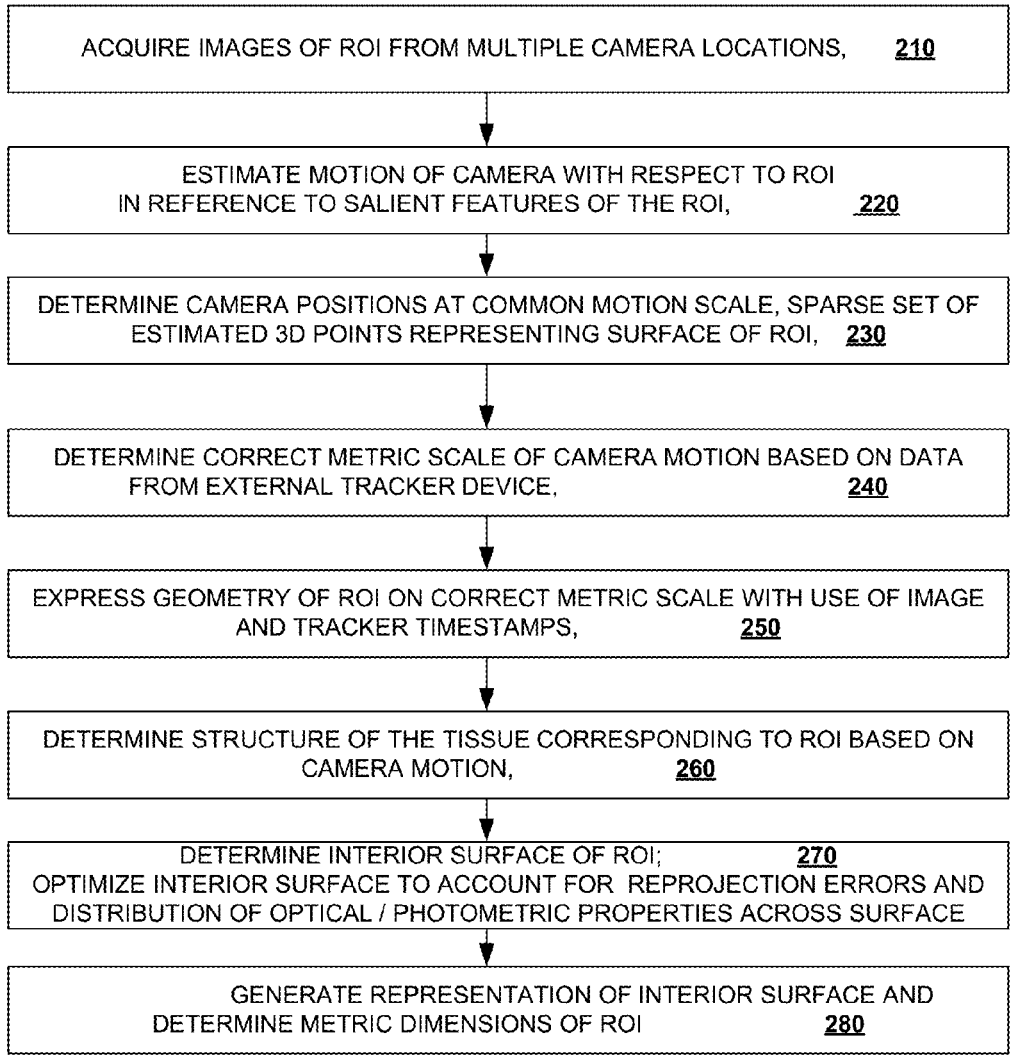
FIG. 2A is a flow-chart illustrating an embodiment of the method of the invention.

In reference to FIG. 2A, to effectuate the process of the invention, the following steps are taken:

Based on the sequence of acquired images of the anatomic ROI, salient features are identified and the motion of the endoscopic camera with respect to the ROI is estimated in reference to salient regions of the imaged anatomy, at steps 210 and 220;

A sparse geometry camera bundle is generated, which consists of the estimated camera positions at a common motion scale, a sparse set of estimated 3D points and the views in which they are visible, at step 230;

An external tracking device (such as, for example, an accelerometer, a gyroscope, an optical tracker, or an electromagnetic tracker) is used to determine the correct (metric) scale of the endoscope motion: data from the external tracking advice are used to apply a true metric scale to the estimated geometry using the image and tracker timestamps, at steps 240 and 250;

The measured motion of the endoscope is used to determine the structure of the biological tissue with respect to the position of the endoscope, at step 260;

The sparse geometry is used to estimate the interior surface of the ROI. The commutation of a mesh is effectuated with the use of the reprojection error of the feature points as well as an (optional) establishing photo-consistency between the 3D surface and its image projections. Refinement of the mesh is performed by solving a constrained optimization problem with Gauss-Newton iterations, at step 270; and Graded diameter of the ROI is further computed, at step 280.

Figure 2B:
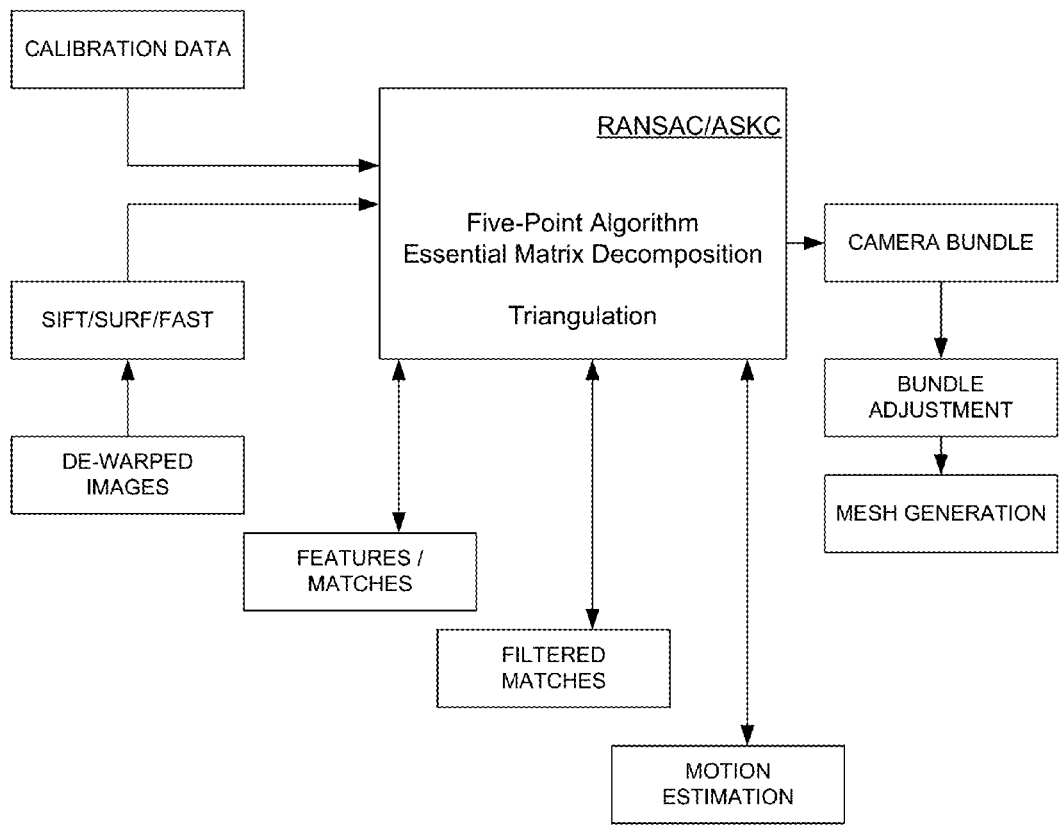
FIG. 2B is a flow-chart providing additional illustration of an embodiment of the invention.

The block scheme of FIG. 2B provides additional illustration to the process flow of the embodiment of the invention. The calibration data comes from pre-processing steps using standard mathematical methods and software. The result is a set of intrinsic camera properties (several—for example, 4 to 6-distortion coefficients and 5 values of the camera matrix). The bi-directional arrows in FIG. 2B describe the intermediate results that are used in the reconstruction process. The embodiment of the method of the invention and results of empirical implementation of the embodiment are discussed below.

Notation.

In the following, a 3D point Pi having coordinates $\{X_i, Y_i, Z_i\}^T$ that has been imaged is denoted by its projected pixel coordinates, in the image j, as $\hat{p}_{i,j}=\{u_{i,j}, v_{i,j}\}^T$ and in normalized homogeneous image coordinates as $p_{i,j}=\{x_{i,j},y_{i,j}\}^T$. The scale-invariant feature transform (SIFT) features are extracted from the endoscopic images and the fast approximate nearest neighbors method is used to compute matches across image pairs. In one embodiment, the SIFT implementation of Vedaldi (see "Vlfeat—an open and portable library of computer vision algorithms", in *Proc. ACM Int. Conf. on Multimedia*, 2010) was used. This feature detection step provides a set of matched SIFT features in pixel coordinates $\{\hat{p}_{i,1},\hat{p}_{i,2}|i\epsilon 1 \ldots n\}$. In normalized homogeneous coordinates $p_{i,1}=\{x_{i,1},y_{i,1}\}^T, p_{i,2}=\{x_{i,2},y_{i,2}\}^T$, a five-point motion estimation algorithm and a random sample consensus algorithm (see Fischler et al., "Random sample consensus: a paradigm for model fitting with aliation to image analysis and automated cartography", in *Commun. ACM*, vol. 24, pp. 381-395, June 1981; and Nister, "An efficient solution to the five-point relative pose problem", in *CVPR*, 2003) was used to arrive at $$\arg\min_{R,T} \Sigma_{i=0}^n p_{i,1}^T (R \cdot sk(T)) p_{i,2} \qquad (1)$$

The result is decomposed into an orthogonal rotations matrix $R\epsilon SO3$ and a translation vector $T\epsilon \mathbb{R}^3$, which describe the repositioning of the imaging camera. Accordingly, the generalized motion associated with the camera between the acquisition of a first and a following second image is expressed as $$F = \begin{pmatrix} R & T \\ 0 & 1 \end{pmatrix} \qquad (2)$$

According to a method of the invention, the motion of the camera among different locations is estimated between the sequentially acquired images in each pair of the image frames. The problem of calibration (or resectioning) of a camera includes the determination of a position and aiming (i.e., translation and rotation) of the camera when a particular image in the series of images is taken. One of the positions of the camera can be used as a reference, with zero translation and rotation. When the scale of translation of the camera between different viewpoints is not known (even if the direction of the translation and the angle or the corresponding rotation are known), such scale can be introduced into the calculation as a constant unknown multiplier $\lambda$. The common scale is computed using the estimated motion between a pair of frames as a reference scale. In particular, an arbitrary scale can be chosen for the translation of the camera from the first viewpoint to the second viewpoint and the location of the point of the imaged scene is reconstructed based on triangulation. When the same operation is carried out for each of the points of the imaged scene, the estimated scene will be principally correct but off by the scaling constant $\lambda$. This is often referred to as a reconstruction that is only accurate "up to scale" and results in "bundle" output data representing the camera motion and sparse geometry estimates. The images and sparse geometry form the input to the surface refinement algorithm.

Scale Recovery.

The first position of the camera is selected as a reference frame C0, and the previously computed normalized scale for the translation motion of the camera is used. In order to determine the true metric scale of the reconstruction, the following hand-eye calibration problem is solved:

$$AX=XB \quad (3)$$

$$\theta_A t_x + t_A = \theta_x t_B + t_x \quad (4)$$

$$\theta_A t_x + \gamma t_F = \theta_x t_B + t_x \quad (5),$$

where $$B = \begin{pmatrix} \theta_B & t_B \\ 0 & 1 \end{pmatrix}$$

is the homogeneous transformation operator describing the position of the tracker coil 120 with respect to the field generator 124;

$$X = \begin{pmatrix} \theta_X & t_X \\ 0 & 1 \end{pmatrix}$$

is the homogeneous transformation from the tracker coil 120 to the camera 116;

$$A = \begin{pmatrix} \theta_A & t_A \\ 0 & 1 \end{pmatrix}$$

describe a correctly scaled position of the camera 116 with respect to the reference frame $A_0$ and $$F = \begin{pmatrix} \theta_A & \gamma t_F \\ 0 & 1 \end{pmatrix}$$

is the up-to-scale position of the camera 116 with respect to the reference frame $A_0$. In addition to the function $t_F$, describing the translational motion of the imaging camera, the operator F includes the additional term $\gamma$ (which is unknown due to "up-to-scale" motion estimation described below). A general solution to AX=XB is provided by Park et al. (in *IEEE Trans. Robotics and Automation*, v. 10, no. 5, pp. 717-721, October 1994) for the case where B and A are known exactly. X is computed as a pre-processing step along with the intrinsic camera and distortion parameters, using a calibration pattern with known size. For each relative camera motion estimate, $F_{ij}$ the corresponding tracker positions $F_i$ and $F_j$ are computed by selecting the two closest time stamps and using spherical quaternion interpolation to estimate the positions $B_i$, $B_j$ of the EM tracker.

The relative positions of the camera centers are computed using the equation $$A = XBX^{-1} \quad (6)$$

and the relative translation scale is computed by solving $$\gamma t F_{ij} = t A_{ij} \quad (7),$$

where Aij is the homogeneous transform from $A_i$ to $A_j$. This approach facilitates the consistent scaling of all camera motion estimates. The estimated relative translation scale $\gamma$ is expected to be more or less noisy depending on the precision of the tracking system, but the maximum likelihood estimate of geometry produced by the sparse bundle adjustment is expected to be preserved. By applying the estimated scale to the reconstructed points, the reconstructed surface becomes accurately scaled to the units supplied by the tracking system.

Spline Surface Representation.

Points of the imaged scene viewed from the different positions by the camera are now mapped onto a 3D surface representing the imaged scene. Given a set of 3D points ($C_1 \ldots C_k$) in a reference frame $F_0$ of the camera occupying a predetermined position, the surface viewed from $F_0$ can be represented using a thin plate spline function using projected homogeneous coordinates ($c_1 \ldots c_k$) as control points. For this purpose, the thin-plate spline parameterization was adopted (as described, for example, by Richta et al., "Three-dimensional motion tracking for beating heart surgery using thin-plate spline deformable model", in *Int. J. Rob. Res.*, v. 29, pp. 218-230, February 2010; or by Bookstein, "Principal warps: Thin-plate splines and the decomposition of deformation", in *IEEE TPAMI.*, v. 11, pp. 567-585, June 1989). This parameterization approach maps points $p=(x, y, 1)^T$ in homogeneous image coordinates to distance in the Z direction along their associated ray, T P S(p; W)=Z. Given control points ($c_1 \ldots c_k$), the mapping function T P S($\cdot$; W) is defined by a weighing vector W, where $$W=(w_1, \ldots w_n, r_1, r_2, r_3) \quad (8).$$

The mapping function TPS is used to estimate on which contour the mapped points pi lie. The mapped-onto-the-surface value of a given point p is given by $$TPS(p, W) = r_1 + r_2 x + r_3 y + \Sigma_{i=0}^k w_i U(\|c_i - p\|) \quad (9),$$

Here, the $U(x) = x^2 \log(x)$ is the radial basis function. Accordingly, a point P on a 3D surface representing the surface of the imaged scene and associated with the point p is characterized as $$P = TPS(p; W) \cdot p = Z \cdot (x, y, 1)^T = (X, Y, Z)^T \quad (10)$$

The Optimization of the Determined Surface may be required to incrementally correct both the camera position estimates $\{F_0 \ldots F_n\}$ and the mapping from the image plane to $R^3$ (the mapping defined as a weighted sum of the control point positions in 3D). Alternatively or in addition, the optimization may be required to correct for photometric errors caused by different photometric properties of different portions of the imaged surface.

To effectuate such correction, the following definitions are used:

The equation $$K^*(P) = K\left(\frac{X}{Z}, \frac{Y}{Z}, 1\right)^T = \hat{p} \quad (11)$$

is defined to transform a 3D point, $P=(X,Y,Z)^T$ to its projected pixel location in the reference frame; $F_n$ is defined as the homogeneous transformation matrix (which describes the $n^{th}$ position of the camera); $I_0$ denote the image at the reference frame, while $I_n$ is used to denote the intensity image of camera at position n; for a 3D point P, the brightness of its projection in the nth image is given by $I_n(K^*(F_n P))$. Assuming, in addition, that the brightness distribution of the imaged surface of the ROI is constant (invariable with respect to the position across the surface) the image of an arbitrary point $P_i$ should have the same intensity when projected into any image. By selecting a uniform set of mesh surface points $P_i$, a photometric error term $D_i$ is defined as a modification of the Helmholtz stereopsis equation (discussed, for example, by Zickler et al., in *Int'l J. of Computer Vision*, pp. 869-884, 2002) as $$D_i = I_0(K^*(P_i)) - I_n(K^*(F_n P_i)) \quad (12)$$

$$D_i = I_0(K^*(p_i)) - I_n(K^*(F_n TPS(p_i; W) \cdot p_i)) \quad (13)$$

As the parameter vector W that defines TPS is derived from $(c_1 \ldots c_k)$ (see above), the computational error associated with imaging of the surface of the ROI is expressed with the following error Jacobian (computed through the Taylor series expansion of the error terms $D_i$ about the current estimate of $(c_1 \ldots c_k)$ and R, T):

$$J_D = \begin{pmatrix} \frac{\partial D_1}{\partial c_1} & \cdots & \frac{\partial D_1}{\partial c_k} & \frac{\partial D_1}{\partial R, t} \\ \vdots & \cdots & \vdots & \vdots \\ \frac{\partial D_n}{\partial c_1} & \cdots & \frac{\partial D_n}{\partial c_k} & \frac{\partial D_n}{\partial R, t} \end{pmatrix} \quad (14)$$

Under the assumption that that the detected image feature matches $c_{j,0}$ and $c_{j,n}$, having come from fiducial markers (such as, for example, anatomical landmarks), or robust matches, are accurate, the mapping function TPS and homogeneous transform $F_n$ should map $c_{j,0}$ to the detected position of $c_{j,n}$. One can, therefore, define the additional error terms as $$E_i = \|K^*(F_n(TPS(c_{j,0}; W) \cdot c_{j,0})) - c_{j,n}\| = 0 \quad (15)$$

These error terms can be written as equality constraints in the minimization of $J_D$. The gradient of these error terms is computed with respect to the translation and rotation parameters $T = \{X, Y, Z\}$ and $\omega = \{\theta_x, \theta_y, \theta_z\}$. The resulting constraint Jacobian $J_E$ and the error Jacobian $J_D$ can be combined into a Karush-Kuhn-Tucker matrix (see Kuhn, Nonlinear programming: a historical view, in SIGMAP Bull., pp. 6-18, June 1982) yielding the following system of equations $$\begin{pmatrix} J_D^T J_D & J_E^T \\ J_E & 0 \end{pmatrix} \begin{pmatrix} \Delta c \\ \Delta(w, T) \\ \lambda \end{pmatrix} = \begin{pmatrix} -J_D^T D \\ E \end{pmatrix} \quad (16)$$

In the above equation, D represents the vector of error terms and $\lambda$ are the Lagrange multipliers associated with the constraint error, E. This formulation combines the photometric error terms $D_i$ with the traditional bundle adjustment terms defined by $E_j$ to compute the optimal correction terms $\Delta c$ and $\Delta(w, T)$.

Optionally, additional corrective measures can be employed to correct the impractical assumption (made above at the stage of optimizing the determined surface) that the brightness of the imaged surface is invariant with respect to a position across the surface (which in the context of endoscopy and other in-vivo procedures is substantially incorrect). While various measures (such as, for example, normalized cross correlation, mutual information and sum of conditional variance are matching metrics) exist to robustly deal with this problem, these methods are not applicable to the case at hand because they do not directly model or inform the three dimensional geometry of the scene imaged with an endoscope.

According to an embodiment of the invention, therefore, an optional step of *Modeling the Reflectance and Brightness Attenuation* may be taken as part of data-processing algorithm. The attenuation of intensity $\{I_0(K^*(P_i)) \ldots I_n(K^*(F_n P_i))\}$ at a given point $P_i$ of the surface with respect to the angle and distance between the camera and the point to $P_i$ is carried out under the Lambertian assumption of reflectance (stating, in short, that the color intensity emitted by an imaged point $P_i$ is proportional to the dot-product of the unit surface normal vector and light source direction at $P_i$:

$$I_n(K^*(F_n P_i)) = \alpha \frac{\cos(\theta_{i,n})}{r_{i,n}^2} \quad (17)$$

Here, the term r is simply the Z-coordinate of $P_i$, which represents the distance from the point $P_i$ to the camera 116 of the endoscope system of the invention. It should be noted that under the assumption of Lambertian reflectance, the intensity is substantially independent of the direction of the viewer and the constant $\alpha$, which represents the unknown albedo of the surface. In the case of an endoscope, the only source of light is at the optical center of the camera, and moves along with it. In other words, the light source and viewer are co-located. Using the estimated camera motions and surface representation determined with the method of the invention, one can further estimate the camera positions $\{F0 \ldots Fn\}$ and the surface normal at any point $P_i$. As a result, the terms $\theta_i$ and $Z_i$ can be easily determined.

The resulting augmentation of the $D_i$ terms to reflect the correct attenuation is represented by the following corrected (geometric brightness) error equation:

$$D_{i,Lambert} = I_0(K^*(F_n P_i)) - I_n(K^*(F_n P_i)) \quad (18),$$

which should replace the Eq. (13) to account for the change in color intensity of the imaged surface as a function of lighting direction.

Empirical Results.

A method of the invention has been applied to both synthesized and actual experiment.

Figure 3A:
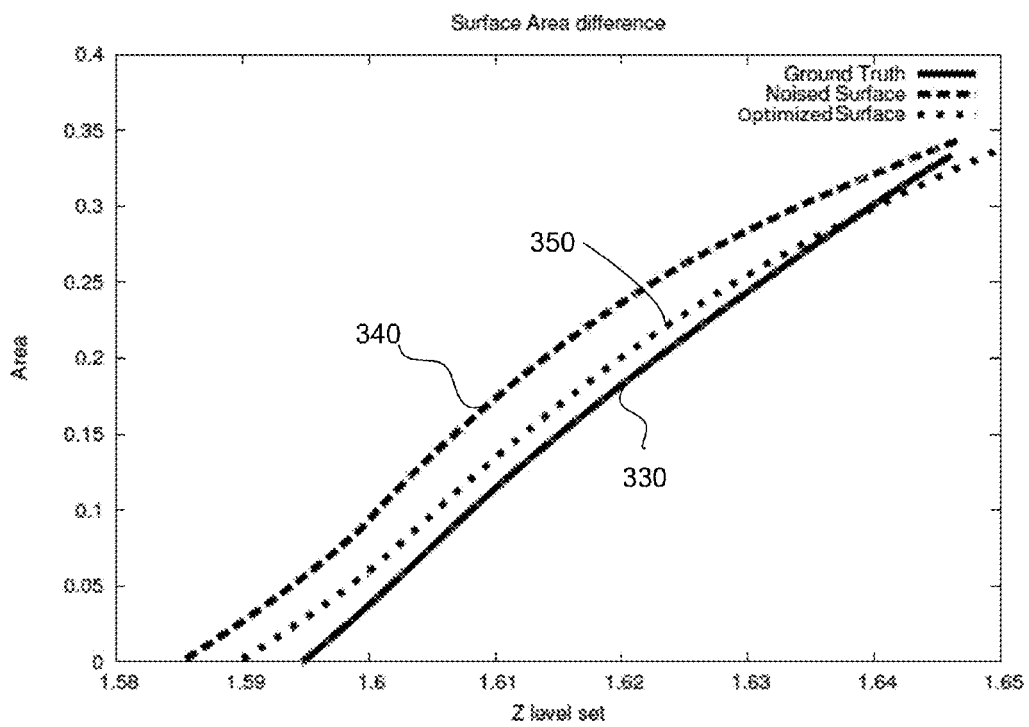
FIG. 3A shows plots illustrating level-set area measurements of the initial, corrected, and ground-truth surfaces of a closed cavity of choice.
Figure 3B:
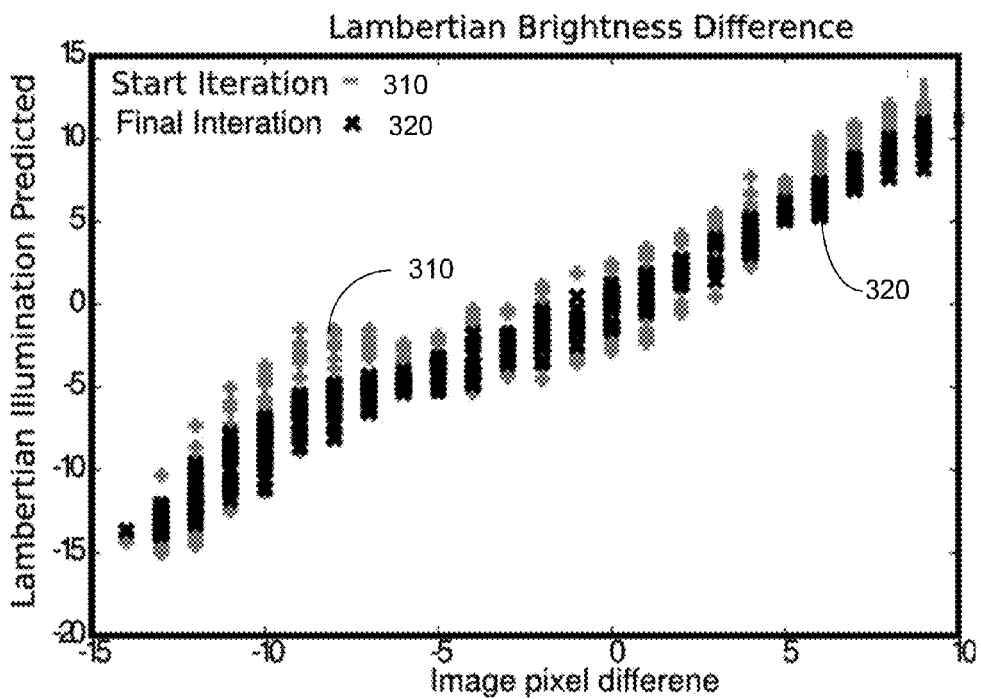
FIG. 3B shows plots illustrating the expected and actual brightness differential of image pixels (under initial and final surface estimates).

In the synthetic experiment, the method was used to render images of a sphere from several viewpoints under the assumption of Lambertian distribution of reflectance of the sphere. According to the algorithm of FIG. 2A, the initial surface was computed with noise-free motions of the camera and sparse geometry; then, the surface-correction (step 270) was applied to the data with noise added to the sparse geometry. FIGS. 3A, 3B show the results of this simulated experiment. In FIG. 3B, the x-axis represent the difference between the value corresponding to a surface point and its projected pixel value, while the y-axis represents the expected difference under the lighting law and the estimated surface geometry. If the estimate of the geometry of the imaged surface, obtained according to the method of the invention, is correct, these values match and all points lie on the line x=y. Points 310 show the values at initialization (start of iteration procedure), while points 320 correspond to the values at the termination of the surface optimization. It can be seen that the predicted brightness differential corresponding to the refined geometry better matches the actual difference in pixel value between the two images than the unrefined geometry. FIG. 3A illustrates the measured area of the scene along the Z-axis of the reference camera. Line 330 shows the values of the noise-free surface, line 340 shows the area measurements of the surface with noise, and line 350 represents the results of surface optimization. It can be seen that the refinement carried out with the algorithm of the invention caused the area of the surface to deform to be more similar to the ground truth value.

Figure 4:
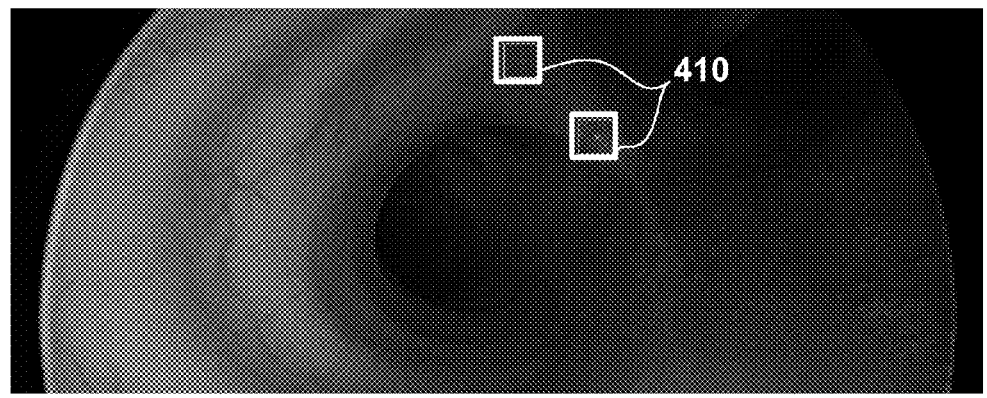
FIG. 4 is an endoscopic image of a larynx cavity.

In a real experiment, images were taken with the system 100 of FIG. 1A from inside a larynx. A typical image is shown in FIG. 4, with areas 410 indicating the presence of visually-perceivable specular reflections. The acquired image data were used according to the data-processing method of the invention to reconstruct the image scene. The results of surface reconstruction for two independently measured larynxes, which vary greatly in shape, texture of the surface, and color, is summarized in FIGS. 5A and 5B.

It is worth noting that Lambertian reflectance is the most basic reflectance model and does not model the specular reflectance that is present in the endoscopic images. In computer graphics, the relationships among a surface, view and light are used to define geometry shades for a surface or material type. In general, any such model of surface reflectance can be inserted into Eq. (18) by simply deriving a change in the brightness function in response to the normal vector camera position, and light position distance to point, in order to model the surface properties of the larynx. The Phong reflection model used in the real experiment is approximated as follows:

$$\alpha(\cos \theta_i + e^\rho - 1) \quad (19)$$

where $\rho = (\cos \theta_i)^\beta$ and $\beta$ accounts for the fall-off of the specular reflectance value as $\cos \theta_i$ decreases. To define $D_{i,Phong}$, the Lambertian lighting model of Eqs. (7, (18) was replaced with this geometric brightness model.

Each of FIGS. 5A, 5B presents a set of three images (I, II, and III). Images I illustrate the images recorded with the endoscope 100 of FIG. 1A. Images II present the corresponding QE surfaces with the reprojected image. Images III show the shaded surfaces that are rendered with the Phong reflectance model.

Comparison with Reference Data and Sensitivity Analysis.

Figure 6A:
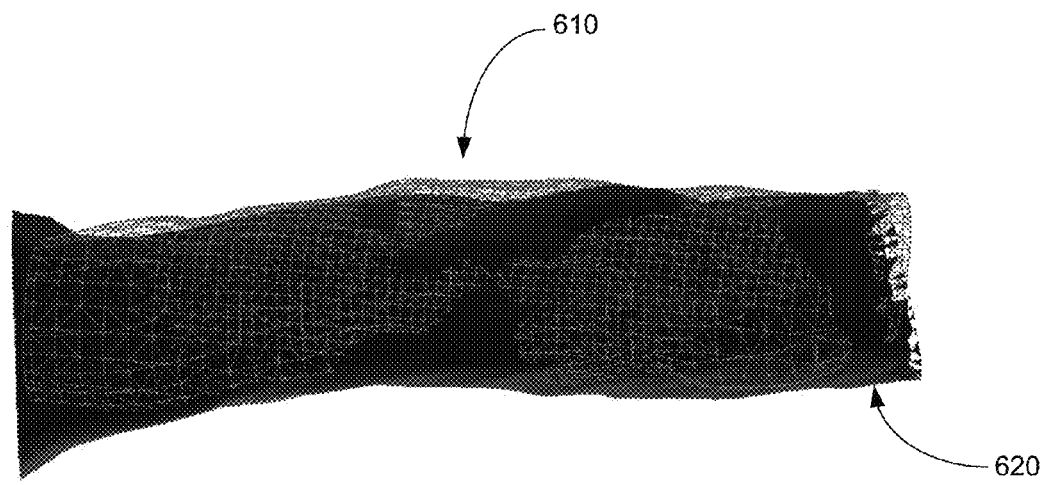
FIGS. 6A, 6B provide examples of registration between the surface of a closed cavity obtained with an embodiment of the invention and that obtained with a different, reference imaging modality. 6A: trachea; 6B: tracheal bifurcation.
Figure 6B:
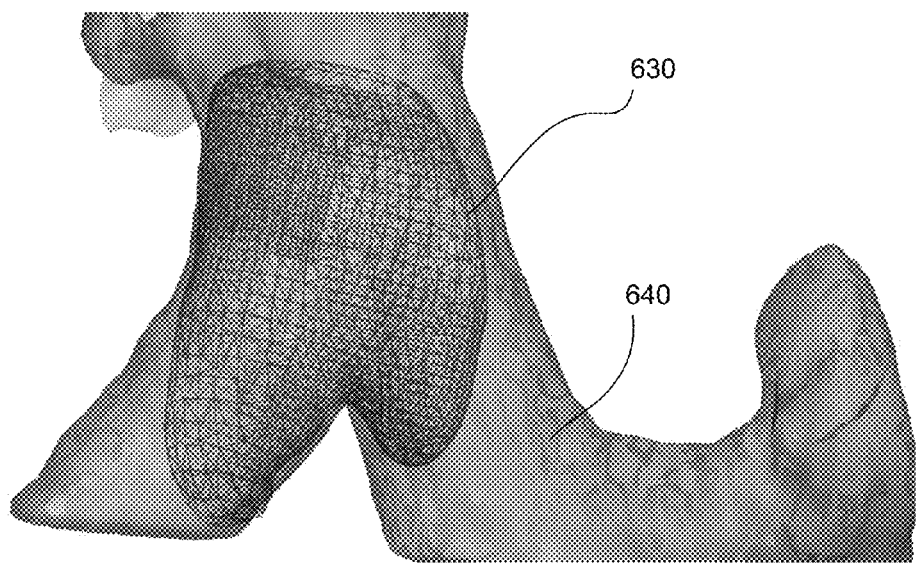
Figure 8A:
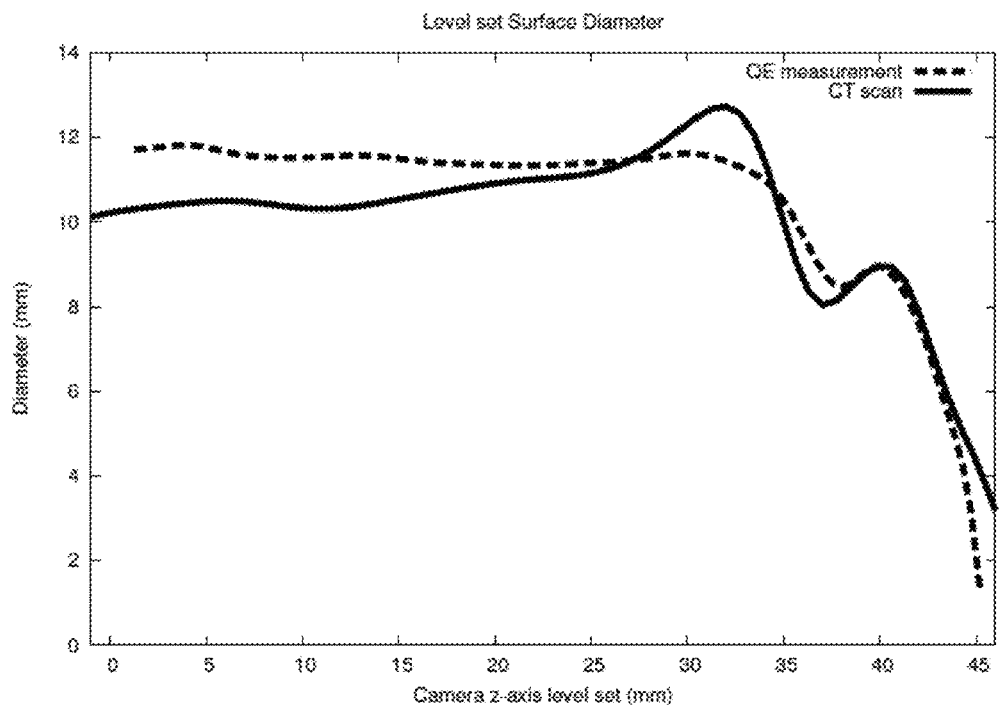
FIGS. 8A through 8D illustrate the comparison between the diameters of the airway cavity measured based on the CT scan data and data obtained with an embodiment of the invention (QE measurement).
Figure 8B:
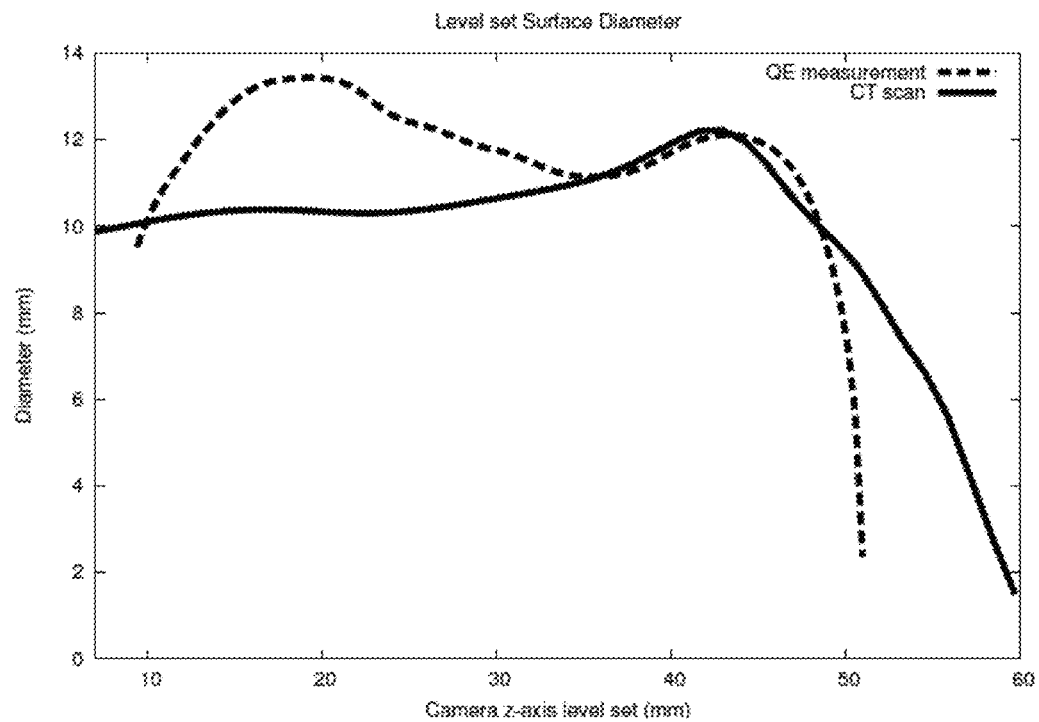
Figure 8C:
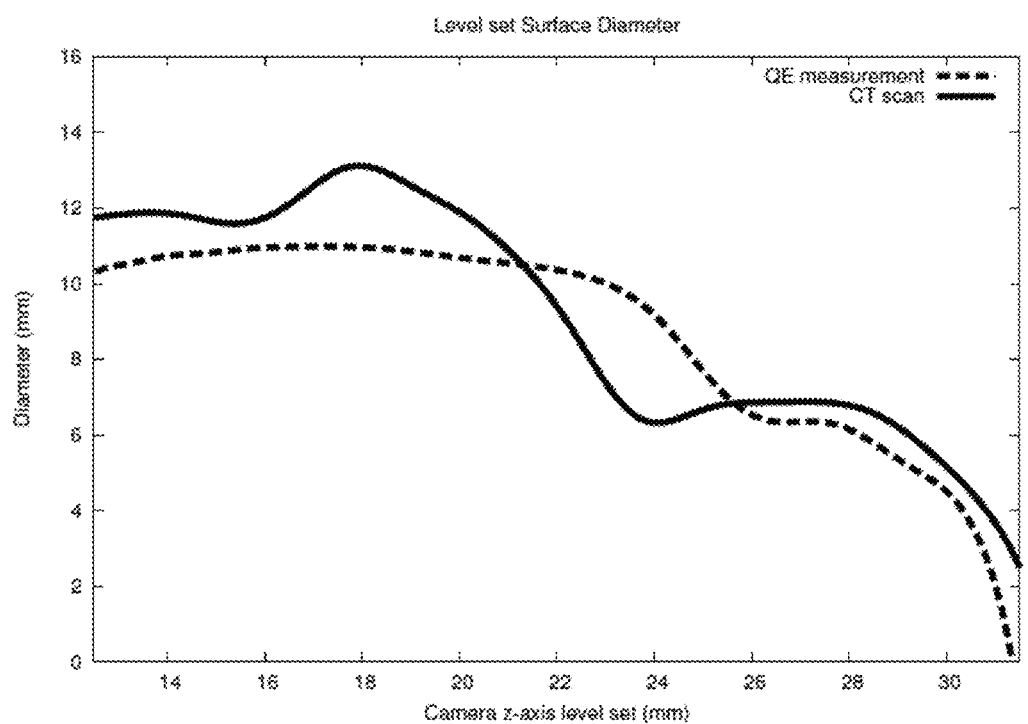
Figure 8D:
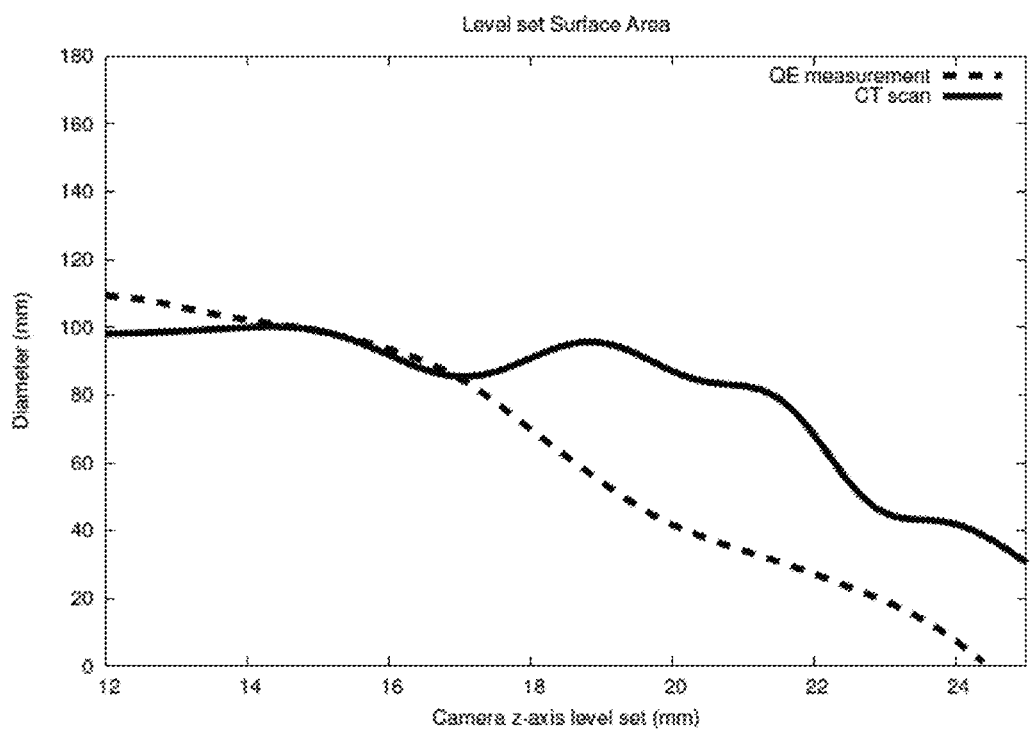

In cases where additional data representing the closed cavity of interest is available that have been independently acquired with a different imaging modality (for example, computed tomography, CT), the resulting QE surfaces can be registered to the surface determined based on the additional data using an initial manual alignment (for example, by using the tracheal bifurcation as a landmark). The registration is then refined iteratively with, for example, the closest point algorithm. FIG. 6A illustrates the generated QE surface 610 corresponding to the trachea that is registered with the surface 620 determined using the CT scan. FIG. 6B provides additional illustration of the registration of the area of the QE surface 630 near the tracheal bifurcation and that obtained with the CT scan, 640. In order to compare the QE and CT surfaces, the corresponding volumes of the trachea were sliced into polygons along the principal axes of the volumes and computed the areas of each of the polygons.

During the comparison of the imaging data obtained with the system and method of the invention with the reference data (such as the CT scan data referred to as the "ground truth" data), the criteria that are clinically important are the accuracy of the measured surface area and diameter of the spline volume. Here, the isosurface of the airway from the voice-box to the carina was extracted with the algorithm of the invention, the comparison between the CT extracted volume and the QE computed volume of the airway an initial alignment by un-rotating and centering the QE volume was performed. To un-rotate, the eigenvectors of the volume's point covariance matrix were computed and the volume was rotated so that the longest eigenvector was aligned with the principal z-axis. Lastly, the mean was subtracted from the point volume. The resulting volume was centered at the origin, with the principal z-axis extending through the trachea. This step is performed on both the CT extracted volume and the QE computed volume, and provides and initial alignment.

Using the axes alignment as a starting point, we use the iterative closest point algorithm to refine the registration. Both axis alignment and ICP are rigid body transforms, so the scale of the QE computed volume does not change.

Figure 7:
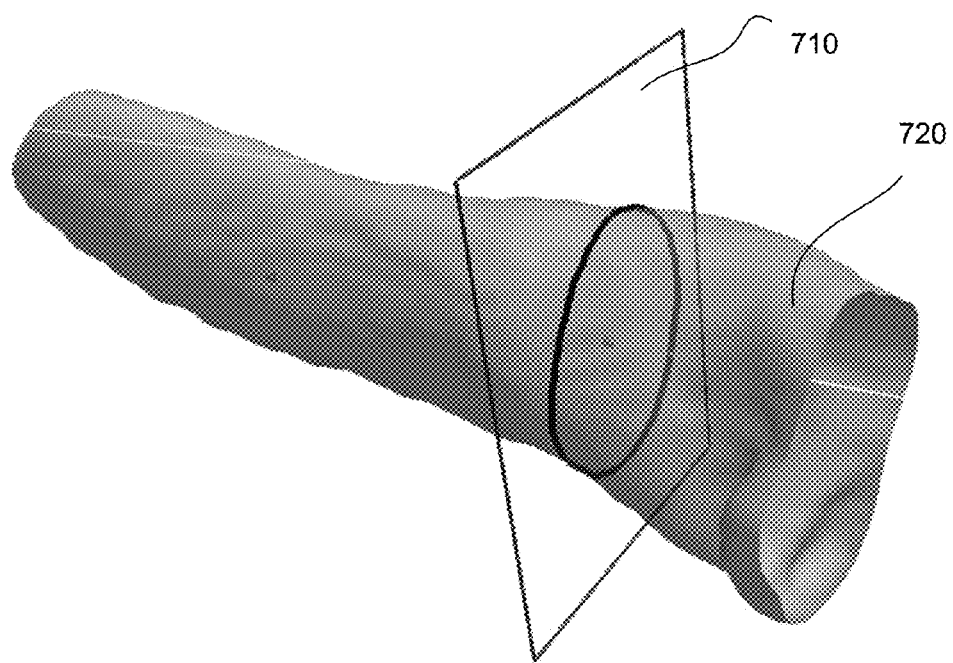
FIG. 7 is a diagram illustrating an example of a level-set curve used to compute the diameter of an airway cavity according to an embodiment of the invention. The principal axis of the volume of the cavity is orthogonal to the plane that is shown to intersect the cavity.

The comparison between the QE and CT volumes is performed as follows. We compute a set of level curves for each volume, at intervals along the principal axis (as shown in FIG. 7, where the plane 710, that is transverse to the airway volume 720, defines the principal axis of the volume as a line that is substantially perpendicular to the plane 710). For each of these curves, we compute the area of the contour using Green's theorem. We then compute the diameter of each contour and compare difference between the two volumes. The results are shown in FIGS. 8A through 8D for three sets of level curves, where the solid lines represent the CT scan and the dashed lines show the QE measurements.

Determination of the quality of the measurement of an area of a closed cavity with an embodiment of the invention is carried out by propagating the covariance of the measurement results. Given that, according to Eq. (9), $$TPS(p,W,R,T) = r_1 + r_2 x + r_3 y + \Sigma_{i=0}^k w_i U(\|c_i - p\|) \quad (20)$$

using the Eq. (10), and denoting $\Sigma z$ as the measurement covariance of the output values Z, of TPS(•), the measurement covariance matrix is determined empirically using the reprojection error of the sparse geometry bundle (based, for example, on Triggs et al., "Bundle adjustment a modern synthesis", in *Vision Algorithms: Theory and Practice, LNCS*; Springer Verlag, 2000, pp. 298-375). Let $J_{TPS}$ define the Jacobian of the mapped values with respect to the thin plate spline parameters:

$$J_{TPS} = \begin{pmatrix} \frac{\partial Z_1}{\partial c_1} & \cdots & \frac{\partial Z_1}{\partial c_k} & \frac{\partial Z_1}{\partial R,t} \\ \vdots & \cdots & \vdots & \vdots \\ \frac{\partial Z_n}{\partial c_1} & \cdots & \frac{\partial Z_n}{\partial c_k} & \frac{\partial Z_n}{\partial R,t} \end{pmatrix} \quad (21)$$

The parameter covariance $\Sigma_{TPS}$ is determined using back propagation of the measurement covariance $\Sigma z$, as $$\Sigma_{TPS} = (J_{TPS}^* \Sigma_Z^{-1} * (J_{TPS})^T)^{-1} \quad (22)$$

If Ji is chosen to denote the Jacobian of the area measurement $A_i$ at distance $Z_i$ $$J_i = \left( \frac{\partial A_i}{\partial X_i} \frac{\partial A_i}{\partial Y_i} \frac{\partial A_i}{\partial Z_i} \cdots \frac{\partial A_i}{\partial X_n} \frac{\partial A_i}{\partial Y_n} \frac{\partial A_i}{\partial Z_n}, \right. \quad (23)$$

where $[(X_j, Y_j, Z_j)$ are the points in the level set $Z_i$, then the covariance matrix of $\Sigma i$ can be approximated as $$\Sigma_i = (J_i^T * \Sigma_{TPS} * J_i) \quad (24)$$

The total variance of the measurement is the trace of $\Sigma i$.

FIGS. 8A through 8D show the variation of a diameter of the CT volume measured along the principal axis of the airway cavity, as well as the aligned QE volumes. The value of the diameter was computed without knowledge of the CT surface, and would serve to provide the clinician an estimate of the measurement quality. Note that this value provides a conservative estimate of the deviation between the QE volume diameter and the CT volume diameter. These data sets each represent a different traversal of the airway from 2 different patients (sets 1 and 2 are from the first patient, sets 3 and 4 are from the second patient). The results illustrated in Table 2 show that the mean deviation is close to zero compared to the diameter. These data sets are based on the alignment of the tracheal bifurcation, which provides an unambiguous registration landmark.

As discussed above, the proposed method of measurement of a true, metric scale based geometric parameter of a closed cavity—for example, a diameter of the corresponding hollow—is an alternative for measurement such parameter with the mechanical means. The proposed experimental methodology for a cavity surface recovery and refinement causes both the surface back-projection and constraint errors to converge and produces a better approximation of the true surface. The advantage of the thin-plate spine function, chosen as a base model for 3D surface fitting, is that the generated surface directly coincides with the sparse geometry (namely, 3D points reconstructed from feature matches), for which the sub-pixel accuracy is achieved at the bundle-adjustment step of the embodiment of the invention. This produces better results than, for example, a NURBS surface that provides an approximation without necessarily touching the control points.

While the preferred embodiments of the present invention have been illustrated in detail, it should be apparent that modifications and adaptations to those embodiments may occur to one skilled in the art without departing from the scope of the present invention.

What is claimed is:

1. A method for determining geometrical characteristics of a closed cavity associated with a tissue with the use of an imaging system, the method comprising:
   at a data-processing unit of the imaging system, receiving first data acquired by an optical camera of the imaging system, the camera being repositionable within the closed cavity, the first data representing the closed cavity on a process-determined scale associated with the closed cavity;
   tracking repositioning of the camera in three-dimensional (3D) space with the use of a tracking element of the imaging system to generate second data representing position and orientation of the camera in 3D, the tracking element being in operable communication with the data-processing unit; and
   with the data-processing unit, recovering a true metric scale of the closed cavity based on the first and second data, the data-processing unit being programmed to derive position and orientation of the camera with respect to a camera's reference frame, the true metric scale representing results of absolute measurement of said geometrical characteristics.

2. A method according to claim 1, further comprising determining structure of the closed cavity on a true geometrical scale and with respect to the derived position and orientation of the camera.

3. A method according to claim 1, further comprising producing a visually-perceivable representation of a structure of the closed cavity in reference to the recovered metric scale.

4. A method according to claim 1, wherein the method is devoid of using x-ray radiation and sizing the closed cavity with the use of a mechanical means.

5. A method according to claim 1, further comprising processing the first data to recover features that are capable of being matched to detect the repositioning of the camera in reference to a view of a surface of the closed cavity.

6. A method according to claim 5, wherein said processing of the first data includes determination of the surface of the closed cavity based at least in part on intensity of light characterizing the surface in reflectance, the determination including adjusting of surface properties that have been computed with the use of said features to define a recovered surface and computation of geometry of local patches of the surface.

7. A method according to claim 6, further comprising combining the recovered surface and computed geometry of local patches to form the surface of the closed cavity.

8. A method according to claim 1, wherein the camera includes a camera associated with an endoscope unit that has been positioned in a tubular bodily cavity, and wherein the geometrical characteristics include a diameter of the tubular bodily cavity graded on the recovered true geometrical scale.

9. An imaging system enabled to generate an image representing a closed bodily cavity, the imaging system comprising:
   an optical camera configured to acquire first data from inside the closed cavity, the acquired first data representing a three-dimensional (3D) structure of said closed cavity on a local topographical scale, the optical camera being enabled to move with respect to the closed cavity;
   a tracking device in operable communication with the optical camera and enabling an acquisition of second data that represents repositioning of the optical camera with respect to the closed cavity; and
   a computer processor in operable cooperation with the optical camera and the tracking element, the computer processor programmed to
      recover a true metric scale associated with geometry of the closed cavity based on the first and second data; and
      determine geometrical characteristics of the closed cavity based on the 3D structure of the closed cavity and with respect to recovered true metric scale, the recovered true metric scale representing results of absolute measurement of said geometrical characteristics.

10. An imaging system according to claim 9, further comprising a display device, and wherein the computer processor is further programmed to cause a formation, on the display device, of a visually-perceivable rendering of the closed cavity, said rendering formed in correspondence with the determined geometrical characteristics.

11. An imaging system according to claim 9, wherein the computer processor is further programmed to:
   identify scale-invariant features of the closed cavity based on stereo-triangulation of the first data; and
   determine a three-dimensional (3D) surface of a portion of the closed cavity based on image intensity data from the first data and the identified scale-invariant features.

12. An imaging system according to claim 11, wherein the computer processor is further programmed to recover a metric scale of motion of the optical camera within the closed cavity based on the second data and to determine a geometrical measure associated with the closed cavity based on the recovered metric scale and the determined 3D surface.

13. An imaging system according to claim 9, further comprising an elongated body,
   wherein the optical camera is housed inside the elongated body, and wherein a portion of the tracking device includes an electrical coil juxtaposed with the elongated body.

14. A method for forming a three-dimensional (3D) rendering a closed cavity of a patient's anatomy, comprising:
    acquiring a series of images of the closed cavity with an imaging system repositionably located therein, different images from the series corresponding to different positions of the imaging system;
    determining a motion of the imaging system based on the images from the series with a data-processing system that is operably cooperated with the imaging system;
    computing a graded dimension of the closed cavity based on a metric scale of the motion of the imaging system that has been determined based at least in part on data representing the repositioning of the imaging system and acquired with the use of a tracking device located externally with respect to the closed cavity; and
    forming the 3D image of at least a portion of the closed cavity in proportion to the computed graded dimension.

15. A method according to claim 14, further comprising based on the data received from the tracking device that is enabled to track at least one of orientation and position of the imaging system in relation to the closed cavity, determining the metric scale of the motion of the imaging system.

16. A method according to claim 14, wherein the determining the metric scale includes determining the metric scale based on the data received from at least one of an electromagnetic tracker, an accelerometer, a gyroscope, and an optical tracker.

17. A method according to claim 14, further comprising determining a structure associated with the closed cavity based on the determined motion of the imaging system and the data representing the repositioning of the imaging system.

* * * * *